US009563354B2

(12) United States Patent
Bellamy et al.

(10) Patent No.: US 9,563,354 B2
(45) Date of Patent: *Feb. 7, 2017

(54) DETECTING INPUT BASED ON MULTIPLE GESTURES

(71) Applicant: International Business Machines Corporation, Armonk, NY (US)

(72) Inventors: Rachel K. E. Bellamy, Bedford, NY (US); Bonnie E. John, New York, NY (US); Peter K. Malkin, Yorktown Heights, NY (US); John T. Richards, Honeoye Falls, NY (US); Calvin B. Swart, Poughkeepsie, NY (US); John C. Thomas, Jr., Solana Beach, CA (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,762

(22) Filed: Jul. 26, 2016

(65) Prior Publication Data

US 2016/0320962 A1    Nov. 3, 2016

Related U.S. Application Data

(63) Continuation of application No. 15/089,809, filed on Apr. 4, 2016, which is a continuation of application No. 14/289,750, filed on May 29, 2014.

(51) Int. Cl.
*G06F 3/0488* (2013.01)
*G06F 3/01* (2006.01)

(52) U.S. Cl.
CPC ........... *G06F 3/04883* (2013.01); *G06F 3/017* (2013.01); *G06F 2203/04808* (2013.01)

(58) Field of Classification Search
CPC .................. G06F 3/04883; G06F 2203/04808; G06F 3/017
USPC ........................................................ 715/745
See application file for complete search history.

(56) References Cited

U.S. PATENT DOCUMENTS

| 8,233,613 | B1 | 7/2012 | Michaelis et al. |
| 2011/0018731 | A1 | 1/2011 | Linsky et al. |
| 2011/0216075 | A1* | 9/2011 | Shigeta ................... G06F 3/017 345/473 |

(Continued)

OTHER PUBLICATIONS

Bragdon et al., "Experimental Analysis of Touch-Screen Gesture Designs in Mobile Environments", CHI 2011 May 7-12, 2011, Vancouver, BC, Canada, Copyright 2011 ACM 978-1-4503-0267-Aug. 11, 2005, pp. 403-412.

(Continued)

*Primary Examiner* — Jennifer To
*Assistant Examiner* — John Repsher, III
(74) *Attorney, Agent, or Firm* — David M. Quinn; William H. Hartwell

(57) ABSTRACT

Detecting user input based on multiple gestures is provided. One or more interactions are received from a user via a user interface. An inferred interaction is determined based, at least in part, on a geometric operation, wherein the geometric operation is based on the one or more interactions. The inferred interaction is presented via the user interface. Whether a confirmation has been received for the inferred interaction is determined.

1 Claim, 4 Drawing Sheets

(56) References Cited

U.S. PATENT DOCUMENTS

| | | |
|---|---|---|
| 2011/0231796 A1 | 9/2011 | Vigil |
| 2011/0248924 A1 | 10/2011 | Bhattacharjee |
| 2012/0249595 A1 | 10/2012 | Feinstein |
| 2013/0021248 A1 | 1/2013 | Eleftheriou |
| 2013/0027434 A1 | 1/2013 | Paul |
| 2013/0050118 A1 | 2/2013 | Kjelsbak et al. |
| 2013/0100036 A1 | 4/2013 | Papakipos et al. |
| 2013/0120282 A1 | 5/2013 | Kukulski |
| 2013/0141375 A1 | 6/2013 | Ludwig et al. |
| 2013/0147833 A1 | 6/2013 | Aubauer et al. |
| 2015/0042623 A1* | 2/2015 | Kato ............... G06F 3/04883 345/178 |
| 2015/0153866 A1* | 6/2015 | Staffans ............... G06F 3/044 345/174 |
| 2015/0346826 A1 | 12/2015 | Bellamy et al. |
| 2016/0018913 A1* | 1/2016 | Zhang ............... G06F 3/0488 345/173 |
| 2016/0202902 A1 | 7/2016 | Bellamy et al. |

OTHER PUBLICATIONS

Goel et al., "WalkType: Using Accelerometer Data to Accommodate Situational Impairments in Mobiie Touch Screen Text Entry", CHI 2012, May 5-10, 2012, Austin, TX, USA, Copyright 2012 ACM 978-1-4503-1015-Apr. 12, 2005, pp. 2687-2696.
Appendix P IBM Patents or Applications Treated as Related. Two Pages. Dated Sep. 20, 2016.
Original U.S. Appl. No. 14/289,750, filed May 29, 2014.
Original U.S. Appl. No. 15/089,809, filed Apr. 4, 2016.

* cited by examiner

DETECTING INPUT BASED ON MULTIPLE GESTURES

BACKGROUND OF THE INVENTION

The present invention relates generally to the field of accessibility, and more particularly to detecting input based on multiple gestures.

In computing, an input device is any peripheral (piece of computer hardware equipment) used to provide data and control signals to an information processing system, such as a computer or other information appliance. A keyboard, a mouse, a scanner, a digital camera and a joystick are each an example of an input device.

A touchscreen is an electronic visual display that the user controls through simple or multi-touch gestures by touching the screen with a special stylus and/or one or more fingers. The user uses the touchscreen to react to what is displayed and to control how it is displayed, for example by increasing the text size.

A user interface is the system by which users interact with a machine, such as a computer. The user interface may include hardware and software components. A user interface enables a computer program to receive input from a user and provide output to the user.

SUMMARY

According to one embodiment of the present disclosure, a method for detecting input based on multiple gestures is provided. The method may include receiving, by one or more processors, one or more interactions from a user via a user interface. The method may further include determining, by one or more processors, an inferred interaction based, at least in part, on a geometric operation, wherein the geometric operation is based on the one or more interactions. The method may further include presenting, by one or more processors, the inferred interaction via the user interface. The method may further include determining, by one or more processors, whether the inferred interaction is confirmed.

According to another embodiment of the present disclosure, a computer program product comprising a computer readable storage medium having program instructions embodied therewith, the program instructions executable by a processor to cause the processor to perform a method for detecting input based on multiple gestures is provided. The method may include receiving, by one or more processors, one or more interactions from a user via a user interface. The method may further include determining, by one or more processors, an inferred interaction based, at least in part, on a geometric operation, wherein the geometric operation is based on the one or more interactions. The method may further include presenting, by one or more processors, the inferred interaction via the user interface. The method may further include determining, by one or more processors, whether the inferred interaction is confirmed.

According to another embodiment of the present disclosure, a computer system comprising a memory and a processor in communication with the memory, wherein the computer system is configured to perform a method for detecting input based on multiple gestures is provided. The method may include receiving, by one or more processors, one or more interactions from a user via a user interface. The method may further include determining, by one or more processors, an inferred interaction based, at least in part, on a geometric operation, wherein the geometric operation is based on the one or more interactions. The method may further include presenting, by one or more processors, the inferred interaction via the user interface. The method may further include determining, by one or more processors, whether the inferred interaction is confirmed.

DETAILED DESCRIPTION

Some embodiments of the present invention recognize that, in many situations and applications, a user of a computing device interacts with an element of an interface. The user may interact with an element by performing a gesture such as, for example, pressing, activating an input device (e.g., clicking a mouse), touching, tapping, or swiping. A motor difficulty, dispositional impairment, or environmental condition impedes the accuracy of an interaction. Such an impedance may be permanent or temporary with respect to the affected user. Examples of impedances include, without limitation, a bumpy bus ride, a medical condition causing reduced motor dexterity, or the small size of an interactive element relative to the size of a user's finger. Similarly, a user may have a need to interact with a precision greater than can be attained with a single gesture. For example, a surgeon operating a high-precision remote surgery system may need to interact more precisely than is possible with a single gesture.

Some embodiments of the present invention provide for detecting input based on multiple gestures. Some embodiments determine a geometric average based on the multiple interaction, each interaction resulting from a gesture by a user. Some embodiments determine an inferred interaction based on statistical information. In an example of one embodiment, a user makes multiple gestures, each being an attempt at an interaction. Based on the attempts, an inferred interaction is determined. The inferred interaction is presented to the user, who confirms or rejects the inferred interaction.

Figure 1:
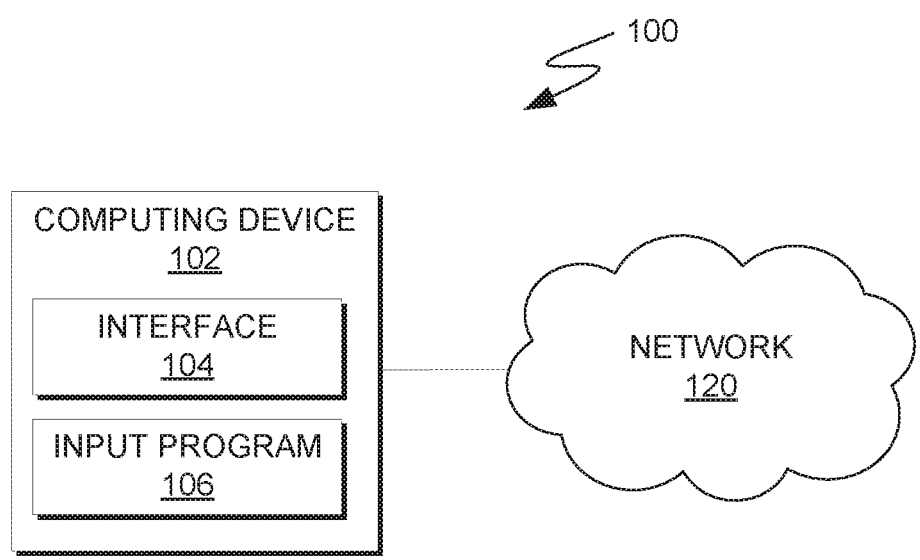
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, generally designated 100, in accordance with an embodiment of the present disclosure. Computing environment 100 includes computing device 102 connected to network 120. Computing device 102 includes interface 104 and input program 106.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to and/or capable of executing interface 104 and input program 106. Computing device 102 may include internal and external hardware components, as depicted and described in further detail with respect to FIG. 4.

In this exemplary embodiment, interface 104 and input program 106 are stored on computing device 102. However, in other embodiments, one or both of interface 104 and input program 106 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications with computing device 102, in accordance with a desired embodiment of the present invention.

Interface 104 is a user interface that includes at least one interface element. In one embodiment, interface 104 is presented to a user of computing device 102, who can interact with interface 104. For example, the user interacts with interface 104 to indicate a selection of one or more interface elements. Each interface element defines a region of interface 104. The user can attempt to interact with an interface element, but instead (e.g., due to an impedance, as discussed above) interacts with another region of interface 104. For example, the user attempts to press, but misses, a button of interface 104. In one embodiment, interface 104 resides on computing device 102. In other embodiments, interface 104 may reside on another computing device, provided that interface 104 can access and is accessible by input program 106. In various embodiments, interface 104 is a user interface generated or presented by any of various applications, programs, or software. For example, a user application operating on computing device 102 generates and presents interface 104 in order to present information and receive interactions from a user of computing device 102.

In various embodiments, interface 104 is a one-, two-, or three-dimensional user interface. For example, interface 104 is a one-dimensional interface including a lever that a user positions. In another example, interface 104 is a two-dimensional interface such as a graphical user interface generated by a computer application. In yet another example, interface 104 is a three-dimensional interface, such as a surgical planning system utilizing physical manipulation of tangible objects. Alternatively, interface 104 is a three-dimensional interface simulated on a two-dimensional display utilizing computer graphics. In one embodiment, interface 104 is presented on a display (e.g., display 420).

Input program 106 operates to detect input based on multiple gestures. Input program 106 receives one or more interactions. Input program 106 determines inferred coordinates based on the one or more interactions. Input program 106 determines an inferred interaction. Input program 106 determines a confidence score for the inferred interaction. Input program 106 determines whether the confidence score is above a threshold. If input program 106 determines that the confidence score is above the threshold, then input program 106 presents the inferred interaction. If input program 106 determines that the confidence score is not above the threshold, then input program 106 receives additional interactions. Input program 106 determines whether confirmation of the inferred interaction has been received. If input program 106 determines that confirmation has been received, then input program 106 performs the confirmed interaction. If input program 106 determines that confirmation has not been received, then input program 106 receives additional interactions. In one embodiment, input program 106 resides on computing device 102. In other embodiments, input program 106 may reside on another computing device, provided that input program 106 can access and is accessible by interface 104.

Figure 2:
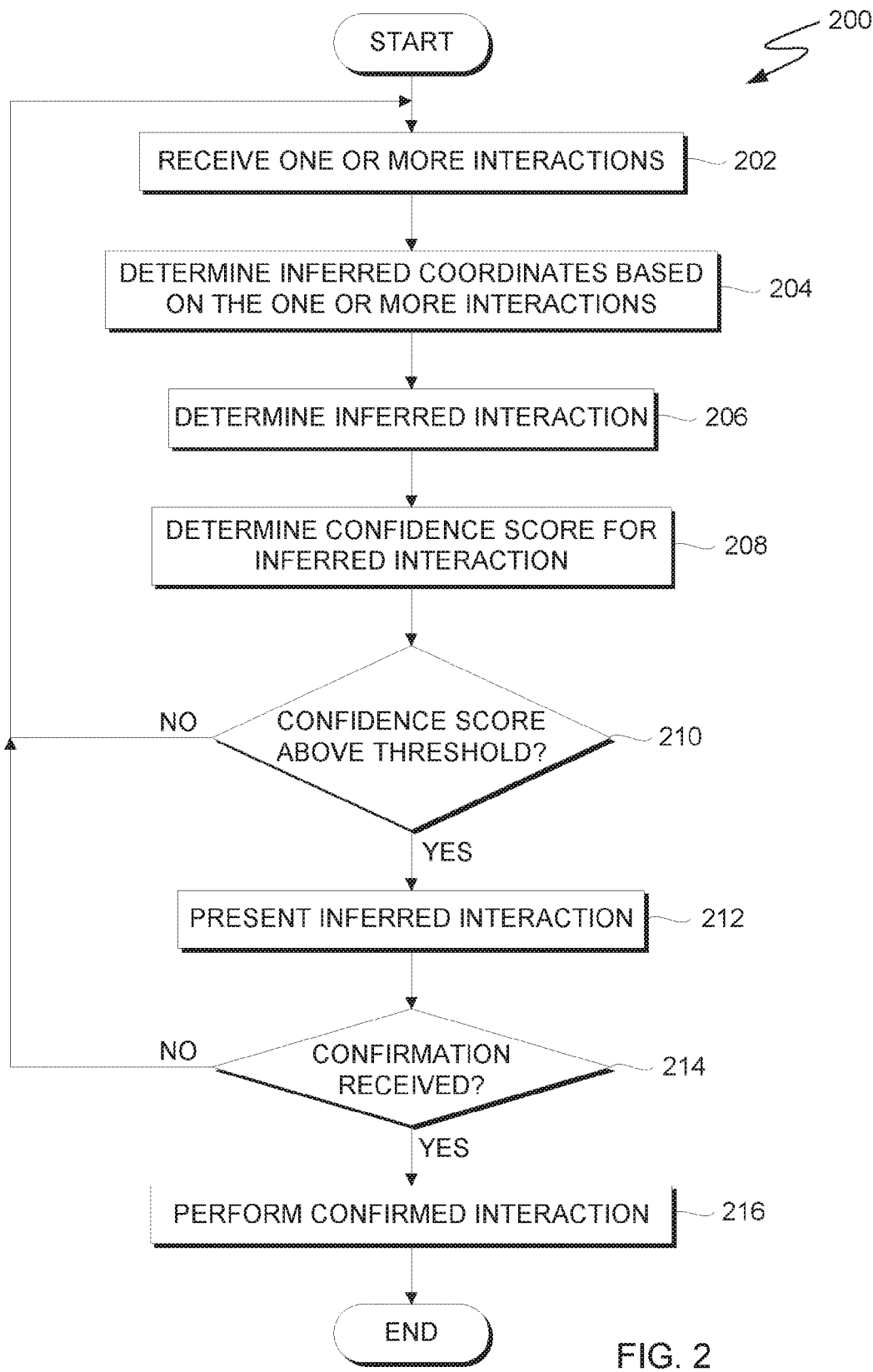
FIG. 2 is a flowchart depicting operations of an input program, on a computing device within the environment of FIG. 1, in accordance with an embodiment of the present disclosure.

FIG. 2 is a flowchart depicting operations of an input program, on a computing device within the environment of FIG. 1, in accordance with an embodiment of the present disclosure. For example, FIG. 2 depicts operations 200 of input program 106, on computing device 102 within computing environment 100 of FIG. 1.

In operation 202, input program 106 receives one or more interactions. In one embodiment, input program 106 receives one or more interactions from a user of computing device 102 via interface 104. In another embodiment, input program 106 receives interactions from a user of computing device 102 by monitoring and intercepting user interactions with interface 104. Each of the one or more interactions includes a set of coordinates identifying a location of the interaction. The set of coordinates include a value for each dimension of the user interface (e.g., interface 104). For example, in a two-dimensional interface, the set of coordinates (x, y) represent the location on the two-dimensional interface of the interaction. In one embodiment, each interaction is located within the boundaries of a region of interface 104 defined by zero or more interface elements.

In some embodiments, an interaction includes more than one set of coordinates. For example, input program 104 receives an interaction resulting from a user performing a continuous gesture (e.g., a swipe). In this case, the interaction indicates sets of coordinates for locations along the path of the continuous gesture.

In some embodiments, input program 106 receives the one or more inputs within an input window. The input window is a time period of pre-determined length since input program 106 last received an interaction. The time period can be of any length. In one example, the input window is a period of two seconds. In this example, two interactions received five seconds apart are not deemed to be attempts at the same intended interaction. Conversely, in this example, any number of interactions is deemed to be attempts at the same intended interaction if each is received within two seconds of receiving the previous interaction. In various embodiments, the input window is pre-programmed, user-configurable, dynamic, or a combination thereof. In one embodiment, the input window is of variable length dependent on a signal from an accelerometer (not shown) of computing device 102. In an example, the input window is longer when computing device 102 detects an unsteady environment, such as while the user is on a bus, train, or other transportation, or while the user is walking or jogging.

In operation 204, input program 106 determines inferred coordinates based on the one or more interactions. The inferred coordinates include one or more sets of coordinates that each represents a location within interface 104. In one embodiment, input program 106 determines the inferred coordinates based on a geometrical average of the one or more received interactions (see operation 202). In one embodiment, input program 106 determines each dimension of the inferred coordinates by averaging the corresponding dimensions of each of the one or more received interactions. For example, input program 106 determines the inferred coordinates for a tapping gesture of a three-dimensional interface by determining a set of coordinates for which the x, y, and z dimensions respectively equal the averages of the x, y, and z dimensions of the received interactions.

Input program 106 determines the inferred coordinates for a continuous gesture (e.g., a swipe) based on the one or more sets of coordinates of each received interaction. For example, interface program 106 determines inferred coordinates for a continuous gesture that follows a straight line. In this case, the inferred coordinates and the one or more received interactions each have a first set of coordinates representing a starting point of the gesture and a second set of coordinates representing an ending point of the gesture. Input program 106 determines each dimension of the first set of coordinates of the inferred coordinates by averaging the corresponding dimensions of the first set of coordinates of each of the one or more received interactions. Similarly, input program 106 determines each dimension of the second set of coordinates of the inferred coordinates by averaging the corresponding dimensions of the second set of coordinates of each of the one or more received interactions. In another embodiment, input program 106 determines inferred coordinates of a continuous gesture utilizing one or more statistical and mathematical techniques (e.g., regression analysis, curve fitting, statistical smoothing, line interpolation), based on the one or more sets of coordinates of each received interaction.

In some embodiments, one or more of the dimensional values utilized in determining the geometric average are weighted. For example, the weight of a value increases or decreases by multiplying the value by a number greater than one or less than one, respectively. In one embodiment, such a multiplier is applied prior to performing the geometric average of the dimensional values. In some embodiments, a dimension of an interaction that is proximate (e.g., within five percent) of the edge of interface 104 is weighted more heavily. The proximity of a set of coordinates to the edge of the interface is determined based, in part, on the resolution of the interface. For example, interface 104 has a resolution of 800 horizontal pixels by 600 vertical pixels. For an interaction occurring at coordinates (775, 300), the x dimension is less than 3.2% from the edge of interface 104. Thus, in a geometric average based, at least in part, on the interaction, the x value of the interaction is weighted. The weight applied increases the closer the dimension is to the edge of an interface. In one example, a dimension within 10% of the edge of interface 104 is multiplied by 1.2, while a dimension within two percent of the edge is multiplied by 2.

In operation 206, input program 106 determines an inferred interaction. In one embodiment, input program 106 determines an inferred interaction by identifying the interface element of interface 104 nearest to the location of the inferred coordinates. Input program 106 identifies the nearest interface element by identifying an interface element that has boundaries encompassing the inferred coordinates. In another embodiment, input program 106 identifies the nearest interface element based on the distance between the inferred coordinates and one or more interface elements. In one embodiment, the distance between the inferred coordinates and an interface element is the geometric difference between the inferred coordinates and the coordinates of a point along a border of the interface element (e.g., the point along the border closest to the inferred coordinates). In another embodiment, the distance is the geometric difference between the inferred coordinates and another point corresponding to the interface element, such as the center-point of the interface element.

In some embodiments, input program 106 determines an inferred interaction based on statistical information of prior interactions. In one embodiment, such statistical information includes measures related to, for example, a count of interactions for one or more interface elements, a frequency of interactions with an interface element relative to one or more other interface elements, or a probability that particular coordinates correspond to an interface element. In various embodiments, the statistical information relates to one or more users. In one embodiment, the statistical information relates to prior interactions of the user upon whose interactions input program 106 is determining an inferred interaction. In another embodiment, the statistical information relates to prior interactions of one or more other users. In an example, an interface presents Button A and Button B proximate to one another, and statistical information indicates that ninety percent of interactions by all users are with Button A, while ten percent are with Button B. In this case, given inferred coordinates for a particular user located between Button A and Button B, input program 106 determines that the inferred interaction is an interaction with Button A.

In some embodiments, the statistical information identifies one or more trends in the differences between the inferred coordinates of prior interactions of the user and the confirmed interactions of the user. In one embodiment, such a trend indicates a statistical relationship between one or more dimensions of the inferred interactions of a user with the corresponding dimensions of confirmed interactions of the user. For example, a trend for a user that tends to miss elements of a two-dimensional interface by performing gestures too low indicates that the y value of the inferred coordinates tends to be less than the y value of the confirmed interactions. Based on such a trend, input program 106 determines that the inferred interaction is more likely to be at coordinates with a y value greater than the inferred coordinates.

In some embodiments, the statistical information defines one or more regions, each of which are, in various examples, within, partially within, or outside of the boundaries of one or more interface elements. For each such region, the statistical information includes a probability that an interaction within the region is intended for a particular interface element. For example, a first region partially overlaps a first interface element and second interface element, and the first region is associated with a 50% probability that an interaction within the first region is intended for the first interface element, a 40% probability for the second interface element, and a 10% probability for a third interface element. In one embodiment, statistical information is compiled based on prior usage information, including prior confirmations of inferred interactions (see decision operation 214 and operation 216).

In operation 208, input program 106 determines a confidence score for the inferred interaction. The confidence score represents a probability that the inferred interaction is the interaction intended by the user. In various embodiments, input program 106 determines the confidence score based on some or all of the following: the proximity of the inferred coordinates to an interface element corresponding to the intended interaction, statistical information, the number of received interactions, and the variance among the received interactions. For example, input program 106 determines a high confidence score based on the inferred coordinates being highly proximate to the interface element of the intended interaction, the number of received interactions being high, and the variance among the received interactions being low.

In decision operation 210, input program 106 determines whether the confidence score is above a threshold. In one embodiment, the threshold is a pre-determined threshold. For example, the threshold is pre-programmed or, alternatively, user-configured. In another embodiment, the threshold is a dynamic threshold generated and/or refined by, for example, machine learning. If input program 106 determines that the confidence score is above the threshold (decision operation 210, YES branch), then input program 106 presents the inferred interaction (operation 212). If input program 106 determines that the confidence score is not above the threshold (decision operation 210, NO branch), then input program 106 receives additional interactions (see operation 202) and proceeds as follows thereafter in order to infer an interaction with a higher confidence score.

In operation 212, input program 106 presents the inferred interaction. In one embodiment, input program 106 presents the inferred interaction by indicating the interface element of the inferred interaction via interface 104. In various examples, input program 106 indicates the interface element by modifying the position, size, color, or pattern of the interface element. In another embodiment, input program 106 indicates the interface element by modifying interface 104 with visual and/or auditory information. In various examples, input program 106 indicates the interface element by text or auditory information to identify the interface element, or by any other visual or auditory modification of interface 104. In other embodiments, input program 106 presents the inferred interaction by an interface other than interface 104. In some embodiments, input program 106 temporarily lengthens the input window in order to allow the user additional time to view the presented inferred interaction. In some embodiments, input program 106 continues to present the inferred interaction either until input program 104 determines that negative confirmation has been received (see decision operation 214) or until input program 104 determines that the confidence score of the inferred interaction does not exceed the threshold (see decision operation 210).

In decision operation 214, input program 106 determines whether confirmation has been received. In one embodiment, input program 106 determines that confirmation has been received based on a confirmation that the presented inferred interaction is the interaction intended by the user. In various embodiments, the confirmation is implicit or explicit. Input program 106 determines that implicit confirmation has been received based on receiving no additional interactions within an input window.

Input program 106 determines that explicit confirmation has been received based on receiving an interaction with a confirmation interface element. For example, input program 106 presents the inferred interaction (see operation 212) by displaying (e.g., via interface 104) a confirmation interface element (e.g., a dialog box, interface button, or audio prompt), which prompts the user to confirm whether the inferred interaction is the interaction intended by the user. Input program 106 receives confirmation based on a user interaction with the confirmation interface element.

In some embodiments, input program 106 receives negative confirmation to indicate that the presented inferred interaction does not match the interaction intended by the user. In one such embodiment, a confirmation interface element allows the user to express either a positive confirmation or a negative confirmation. For example, the confirmation interface element is a dialog box that prompts the user to confirm whether the inferred interaction was inferred correctly, and provides a "yes" button representing a positive confirmation and a "no" button representing a negative confirmation.

In various embodiments, input program 106 receives confirmation by any input means, including, but not limited to: interface 104, a peripheral device (e.g., mouse, keyboard, assistive device), or auditory (e.g., spoken) input.

If input program 106 determines that confirmation has not been received (decision operation 214, NO branch), then input program 106 receives additional interactions (see operation 202) and proceeds as follows thereafter. In some embodiments, input program 106 ceases presentation of the inferred interaction. In other embodiments, input program 106 continues presentation of the inferred interaction. For example, input program 106 continues to present an inferred interaction that was implicitly negatively confirmed. Alternatively, input program 106 ceases to present an inferred interaction that was expressly negatively confirmed. In one embodiment, input program 106 disregards an interface element of an inferred interaction that was expressly negatively confirmed when determining a subsequent inferred interaction. For example, input program 106 disregards the such an interface element, thereby preventing the suggestion of the same inferred interaction multiple times after a user has already rejected it as the interaction intended by the user.

If input program 106 determines that confirmation has been received (decision operation 214, YES branch), then input program 106 determines the confirmed interaction to be the inferred interaction (operation 216). In some embodiments, input program 106, in response to determining the confirmed interaction, performs the confirmed interaction via interface 104. For example, input program 106 performs an interaction with an interface element in response to determining that the confirmed interaction is the interaction with the interface element.

Figure 3:
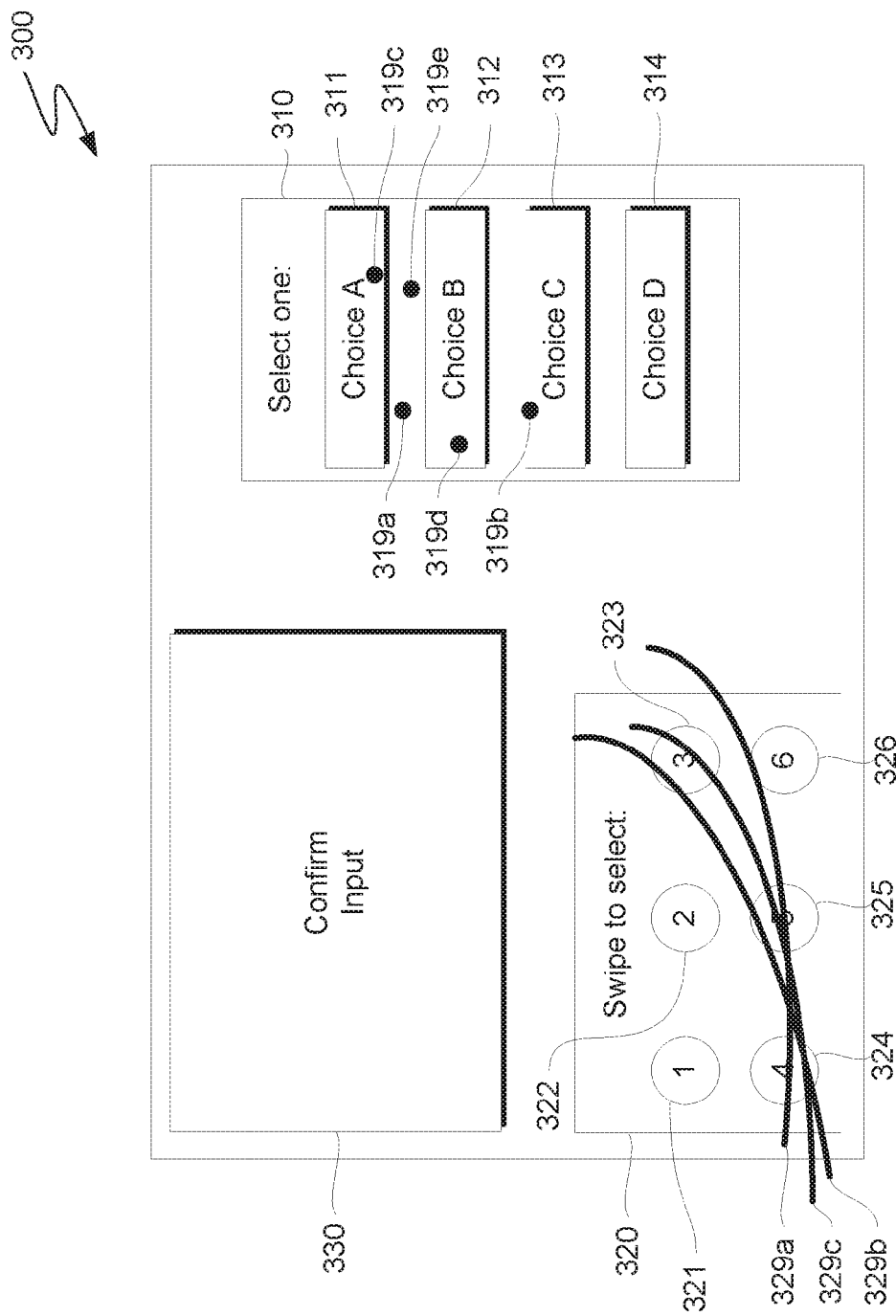
FIG. 3 is an illustrative example of a user interface, on a computing device within the environment of FIG. 1, in accordance with an embodiment of the present disclosure.

FIG. 3 is an illustrative example of a user interface, on a computing device within the environment of FIG. 1, in accordance with an embodiment of the present disclosure. For example, FIG. 3 is an illustrative example of a user interface, generally designated 300, on computing device 102 within computing environment 100 of FIG. 1.

Interface 300 is presented (e.g., displayed) to a user of computing device 102. Interface 300 is an example of interface 104. Interface 300 includes element group 310, element group 320, and confirmation input element 330. Element group 310 includes interface elements 311, 312, 313, and 314, each of which is an interactive user interface element. Element group 320 includes interface elements 321, 322, 323, 324, 325, and 326, each of which is an interactive user interface element.

In this example, a user of computing device 102 attempts a first interaction and a second interaction with interface 300. The first interaction that the user attempts is an interaction with input element 312. Thus, the intended interaction is an interaction with input element 312. In this example, the user attempts the first interaction with five successive gestures before confirming a presented inferred interaction, as will be described below.

Input program 106 receives interaction 319a based on the user performing a gesture (see operation 202). Input program 106 determines inferred coordinates based on the coordinates of interaction 319a (see operation 204). Input program 106 determines an inferred interaction with interface element 311 (see operation 206). Input program 106 determines a confidence score for the inferred interaction (see operation 208). In response to determining that the confidence score does not exceed a pre-determined threshold (see decision operation 210), input program 106 receives additional interactions (see operation 202).

Input program 106 receives interaction 319b based on the user performing another gesture (see operation 202). Input program 106 determines inferred coordinates based on the coordinates of interaction 319a and 319b (see operation 204). Input program 106 determines an inferred interaction with interface element 312 (see operation 206). Input program determines a confidence score for the inferred interaction (see operation 208). Based on the confidence score exceeding a pre-determined threshold (see decision operation 210), input program 106 presents the inferred interaction with interface element 312 (see operation 212). Input program 106 determines whether confirmation has been received (see decision operation 216). Input program 106 can determine that confirmation has been received based on, for example, input program 106 receiving no additional inputs within an input window, or input program 106 receiving an interaction with confirmation input element 330.

However, in this example, the user continues to perform gestures, so input program 106 determines that no confirmation of the presented inferred interaction was received (see decision operation 214). Input program 106 receives interactions 319c, 319d, and 319e based on the user performing additional gestures (see operation 202). For each, input program 106 proceeds as described above in connection with each of interactions 319a and 319b. In various embodiments, based on each additional interaction, input program 106 updates some or all of the determination of the inferred coordinates, the determination of the inferred interaction, and the confidence score. For example, updating the inferred interaction includes re-computing a geometric average based on the one or more received interactions, including any additional interactions. Input program 106 continues to present an inferred interaction with interface element 312 (see operation 212). Based on input program 106 receiving no further interactions (after interaction 319e) within an input window, input program 106 determines that the presented inferred interaction with interface element 312 is implicitly confirmed (see decision operation 214). Input program 106 performs the confirmed interaction with interface element 312 (see operation 216).

The second interaction is an interaction with interface elements 323, 324, and 325. The user attempts the second interaction with three successive, continuous gestures. Input program 106 receives interaction 329a (see operation 202). Input program 106 determines inferred coordinates based on the coordinates of interaction 329a (see operation 204). Input program 106 determines an inferred interaction with interface elements 324, 325, and 326 (see operation 206). Input program 106 determines a confidence score for the inferred interaction (see operation 208). In response to determining that the confidence score exceeds a pre-determined threshold (see decision operation 210), input program 106 presents the inferred interaction (see operation 212). The user views the inferred interaction and performs another continuous gesture, thereby implicitly rejecting the inferred interaction. Input program 106 determines that no confirmation has been received for the inferred interaction based on receiving interaction 329b (see decision operation 214).

Input program 106 determines inferred coordinates based on interactions 329a and 329b (see operation 204). Input program 106 determines an inferred interaction with interface element 324 and 325 based in part, in this example, on a determination that the inferred interaction would not select either interface element 323 or 326 (see operation 206). Input program 106 determines a confidence score for the inferred interaction (see operation 208). In this example, input program 106 determines a low confidence score based on the length of the received interaction beyond the boundaries of the interface elements selected by the inferred interaction (i.e., interface elements 324 and 325). Input program 106 determines that the confidence score does not exceed the predetermined threshold (see decision operation 210). In response, input program 106 ceases to present the inferred interaction (see operation 212). The user observes that no inferred interaction is presented and makes a third continuous gesture. In this example, all three gestures occurred within the input window.

Input program 106 determines inferred coordinates based on interactions 329a, 329b, and 329c (see operation 204). Input program 106 determines an inferred interaction with interface elements 324, 325, and 323 (see operation 206). Input program 106 determines a confidence score for the inferred interaction (see operation 208). Input program 106 determines that the confidence score exceeds the predetermined threshold (see decision operation 210). In response, input program 106 presents the inferred interaction (see operation 212). The user observes the inferred interaction and performs a gesture to interact with confirmation input 130. Input program 106 determines that confirmation of the inferred interaction has been received based on input program 106 receiving an interaction with confirmation input 130 (see decision operation 214). Input program 106 performs the confirmed interaction, being an interaction with interface elements 324, 325, and 323 (see operation 216).

Figure 4:
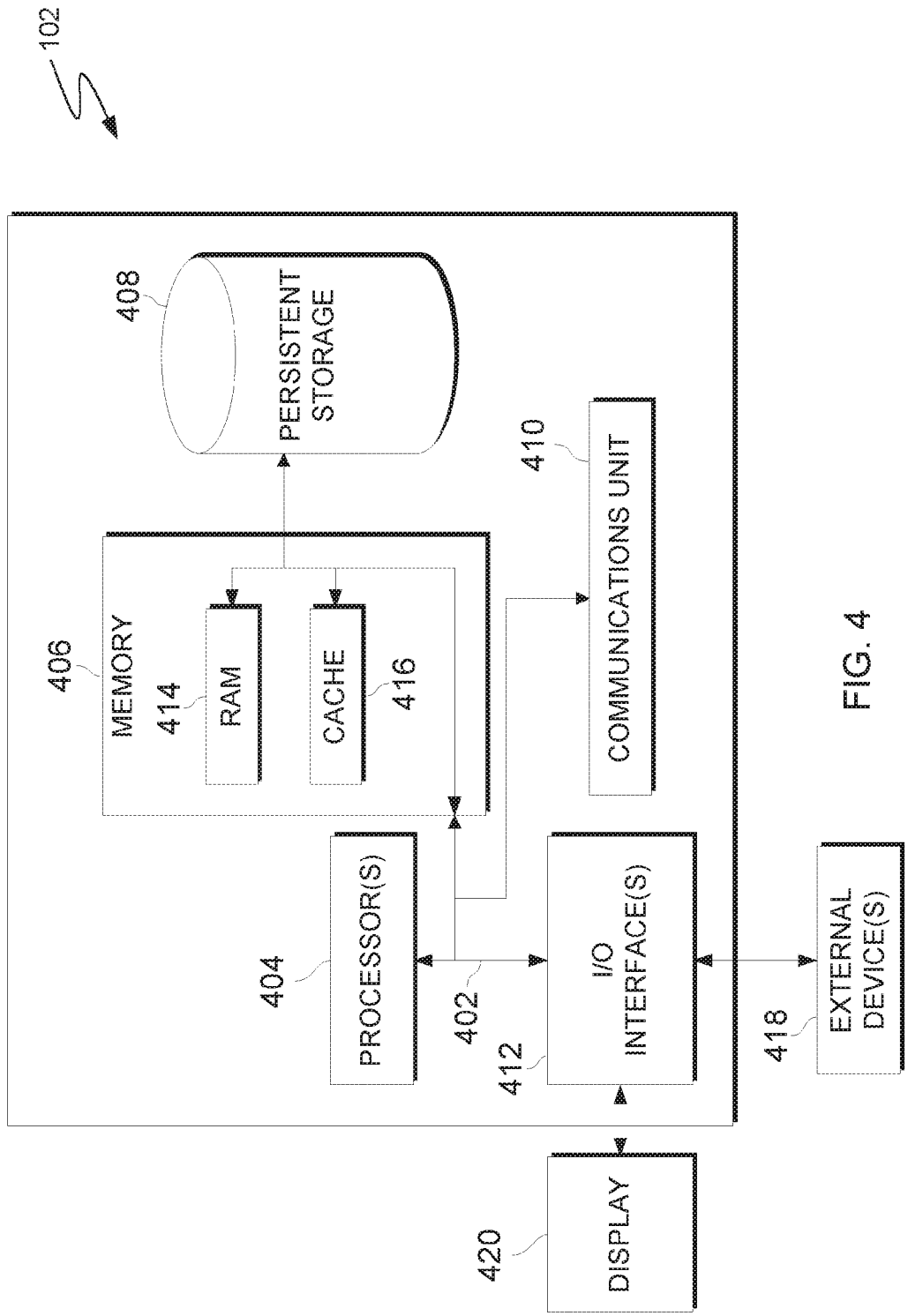
FIG. 4 depicts a block diagram of components of the computing device executing the input program, in accordance with an embodiment of the present disclosure.

FIG. 4 depicts a block diagram of components of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Interface 104 and input program 106 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 4XX. In these examples, communications unit 410 includes one or more network interface cards. Communications unit 410 may provide communications through the use of either or both physical and wireless communications links. Interface 104 and input program 106 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., interface 104 and input program 106, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The term(s) "Smalltalk" and the like may be subject to trademark rights in various jurisdictions throughout the world and are used here only in reference to the products or services properly denominated by the marks to the extent that such trademark rights may exist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, wherein the computer readable storage medium is not a transitory signal per se, the program instructions executable by a processor to cause the processor to perform a method comprising:

receiving one or more interactions from a user via a user interface, wherein the one or more interactions include a touch gesture performed on a touch screen;

determining an inferred interaction based, at least in part, on a geometric average of coordinate dimensions of the one or more interactions, one or more weights based on a closeness of the coordinate dimensions to an edge of the user interface, and statistical information corresponding to the user interface;

determining a probability that the inferred interaction is an interaction intended by the user;

in response to determining that the probability is above a pre-determined threshold, presenting the inferred interaction via the user interface;

determining whether a confirmation has been received for the inferred interaction by identifying the inferred interaction via the user interface, presenting an interface element via the user interface, the interface element prompting the user for the confirmation of the inferred interaction, and receiving an interaction via the interface element;

in response to determining that the confirmation has been received for the inferred interaction, determining that the confirmation is a positive confirmation;

in response to determining that the confirmation is a positive confirmation, performing the inferred interaction;

receiving one or more additional interactions from the user via the user interface; and updating the inferred interaction based on a geometric average of the coordinate dimensions of the one or more interactions and coordinate dimensions of the one or more additional interactions, one or more weights based on a closeness of the coordinate dimensions of the one or more additional interactions to an edge of the user interface, and additional statistical information corresponding to the user interface.

* * * * *